United States Patent
Kashem et al.

(10) Patent No.: US 12,079,490 B2
(45) Date of Patent: Sep. 3, 2024

(54) REDUCING POWER CONSUMPTION ASSOCIATED WITH FREQUENCY TRANSITIONING IN A MEMORY INTERFACE

(71) Applicant: Advanced Micro Devices, Inc., Santa Clara, CA (US)

(72) Inventors: Anwar Kashem, Boxborough, MA (US); Craig Daniel Eaton, Austin, TX (US); Pouya Najafi Ashtiani, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/565,372

(22) Filed: Dec. 29, 2021

(65) Prior Publication Data

US 2023/0205433 A1  Jun. 29, 2023

(51) Int. Cl.
G06F 3/06 (2006.01)

(52) U.S. Cl.
CPC .......... G06F 3/0625 (2013.01); G06F 3/0655 (2013.01); G06F 3/0673 (2013.01)

(58) Field of Classification Search
CPC ..... G06F 3/0625; G06F 3/0655; G06F 3/0673
See application file for complete search history.

(56) References Cited

U.S. PATENT DOCUMENTS

| | | | |
|---|---|---|---|
| 2012/0066445 A1* | 3/2012 | Searles | G06F 13/4072 365/194 |
| 2012/0173836 A1 | 7/2012 | Yermalayeu | |
| 2013/0124806 A1* | 5/2013 | Searles | G06F 1/3275 711/154 |
| 2014/0215130 A1 | 7/2014 | Chen et al. | |
| 2017/0277446 A1 | 9/2017 | Cheong | |
| 2018/0348838 A1* | 12/2018 | Cox | G06F 1/324 |
| 2021/0064116 A1 | 3/2021 | Zerbe et al. | |
| 2021/0294509 A1* | 9/2021 | Iwata | G06F 3/0625 |
| 2021/0312057 A1* | 10/2021 | Kloth | G06F 9/4403 |

FOREIGN PATENT DOCUMENTS

KR  10-2021-0004611 A   1/2021

* cited by examiner

*Primary Examiner* — Zhuo H Li
(74) *Attorney, Agent, or Firm* — Volpe Koenig (57) ABSTRACT

Methods and systems are disclosed for frequency transitioning in a memory interface system. Techniques disclosed include receiving a signal indicative of a change in operating frequency, into a new frequency, in a processing unit interfacing with memory via the memory interface system; switching the system from a normal mode of operation into a transition mode of operation; updating control and state register (CSR) banks of respective transceivers of the system through a mission bus used during the normal mode of operation; and operating the system in the new frequency.

24 Claims, 5 Drawing Sheets

REDUCING POWER CONSUMPTION ASSOCIATED WITH FREQUENCY TRANSITIONING IN A MEMORY INTERFACE

CROSS REFERENCE TO RELATED APPLICATION

U.S. patent application Ser. No. 17/564,327, filed Dec. 29, 2021, titled "DRAM specific interface calibration via programmable training sequences," and U.S. patent application Ser. No. 17/564,426, filed Dec. 29, 2021, titled "variable tick for DRAM interface calibration," are hereby incorporated by reference herein by their entirety.

BACKGROUND

To reduce power consumption, modern processors change their operating frequency based on the nature of the workload. For example, when streaming video or playing a game, the operating system may set the processor to operate at relatively high frequency, while, when running an editing application, the operating system may set the processor to operate at relatively low frequency. Similarly, a firmware component, such as a memory interface, may be set to operate at different frequencies based on its workload. In order to maintain low power consumption, the hardware and the mechanisms that facilitate transitioning from one frequency to another have to be power and time efficient.

BRIEF DESCRIPTION OF THE DRAWINGS

A more detailed understanding may be had from the following description, given by way of example in conjunction with the accompanying drawings wherein.

DETAILED DESCRIPTION

A memory interface system and methods are provided that facilitate power efficient transitioning from one operating frequency to another. Operating parameters that control the interface circuitry of the system are trained at various operating frequencies, resulting in frequency-dependent versions of the operating parameters that are stored in static random-access memory (SRAM). When the system is triggered to change its operating frequency to a new frequency, the same bus that is used by the system in its normal operating mode to exchange data from and to the interfaced memory is utilized to transfer a version of the operational parameters (calibrated at the new frequency) from the SRAM to respective control and state registers (CSRs) associated with the interface circuitry. Such reuse of an already existing bus saves hardware and die space, and, thereby, reduces power consumption. Further, reuse of an already existing bus shortens reprogramming time of the CSRs. The SRAM is structured to allow for parallel writing of the operating parameters into the respective CSRs. Using SRAM to store the versions of operating parameters and concurrently updating the CSRs with the version that corresponds to the frequency the system is transitioned into allow for a faster and a more power efficient transition.

Aspects of the present disclosure describe methods for frequency transitioning in a memory interface system. The methods comprise receiving a signal indicative of a change in operating frequency, into a new frequency, in a processing unit interfacing with memory via the system, switching the system from a normal mode of operation into a transition mode of operation, updating CSR banks of respective transceivers of the system through a mission bus used during the normal mode of operation, and operating the system in the new frequency.

Aspects of the present disclosure also describe a memory interface system for frequency transitioning. The system comprises at least one processor and memory storing instructions. The instructions, when executed by the at least one processor, cause the processor to: receive a signal indicative of a change in operating frequency, into a new frequency, in a processing unit interfacing with memory via the system, switch the system from a normal mode of operation into a transition mode of operation, update CSR banks of respective transceivers of the system through a mission bus used during the normal mode of operation, and operate the system in the new frequency.

Further, aspects of the present disclosure describe a non-transitory computer-readable medium comprising instructions executable by at least one processor to perform methods for frequency transitioning in a memory interface system. The methods comprise receiving a signal indicative of a change in operating frequency, into a new frequency, in a processing unit interfacing with memory via the system, switching the system from a normal mode of operation into a transition mode of operation, updating CSR banks of respective transceivers of the system through a mission bus used during the normal mode of operation, and operating the system in the new frequency.

Figure 1:
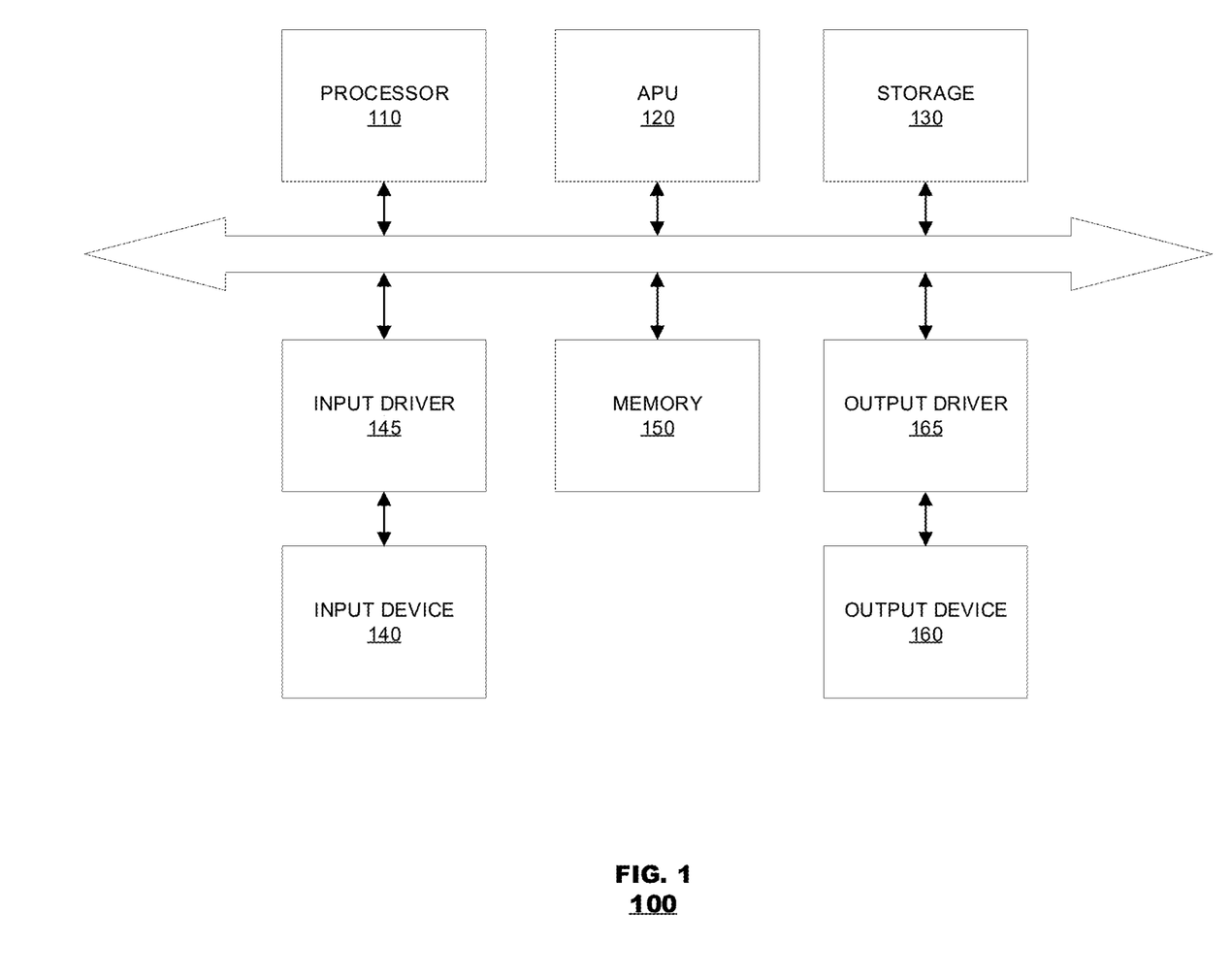
FIG. 1 is a block diagram of an example device, based on which one or more features of the disclosure can be implemented.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 can include a processor 110, an accelerated processing unit (APU) 120, storage 130, an input device 140, memory 150, and an output device 160. The device 100 can also include an input driver 145 and an output driver 165. The processor 110 and the APU 120 can represent one or more cores of central processing units (CPUs) and one or more cores of APUs, respectively. The memory 150 can represent volatile or non-volatile memory, including random-access memory (RAM), SRAM, dynamic random-access (DRAM), a cache, or a combination thereof. The processor 110, the APU 120, and the memory 150, or a subset thereof, may be located on the same die or on separate dies. In an aspect, the device 100 can include additional components not shown in FIG. 1.

The APU 120 can represent a graphics processing unit (GPU), that is, a shader system comprising one or more parallel processing units that are configured to perform computations, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160).

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

The memory interface system disclosed herein is configured to operate in three operational modes (or phases). The first mode is a training mode of operation. In this mode the system is configured to carry out training through which operating parameters are calibrated (e.g., as disclosed in U.S. patent application Ser. No. 17/564,327, filed Dec. 29, 2021, titled "DRAM specific interface calibration via programmable training sequences," and in U.S. patent application Ser. No. 17/564,426, filed Dec. 29, 2021, titled "variable tick for DRAM interface calibration"). The second mode is a normal mode of operation. In this mode the system functions in its intended use, providing a reliable interface to memory. That is, the system is configured to facilitate access to memory, including reading and writing operations initiated by a processor. During this normal mode, the calibrated operating parameters, stored in respective CSRs associated with respective interface circuitry, tune the interface circuitry through which access is performed. The third mode is a transition mode of operation. In this mode, the system is configured to respond to a change in operating frequency by updating the operating parameters, stored in the CSRs, with another version of operating parameters that were calibrated at the frequency the system is transitioned into. The memory interface system is further described in reference to FIGS. 2-5.

Figure 2:
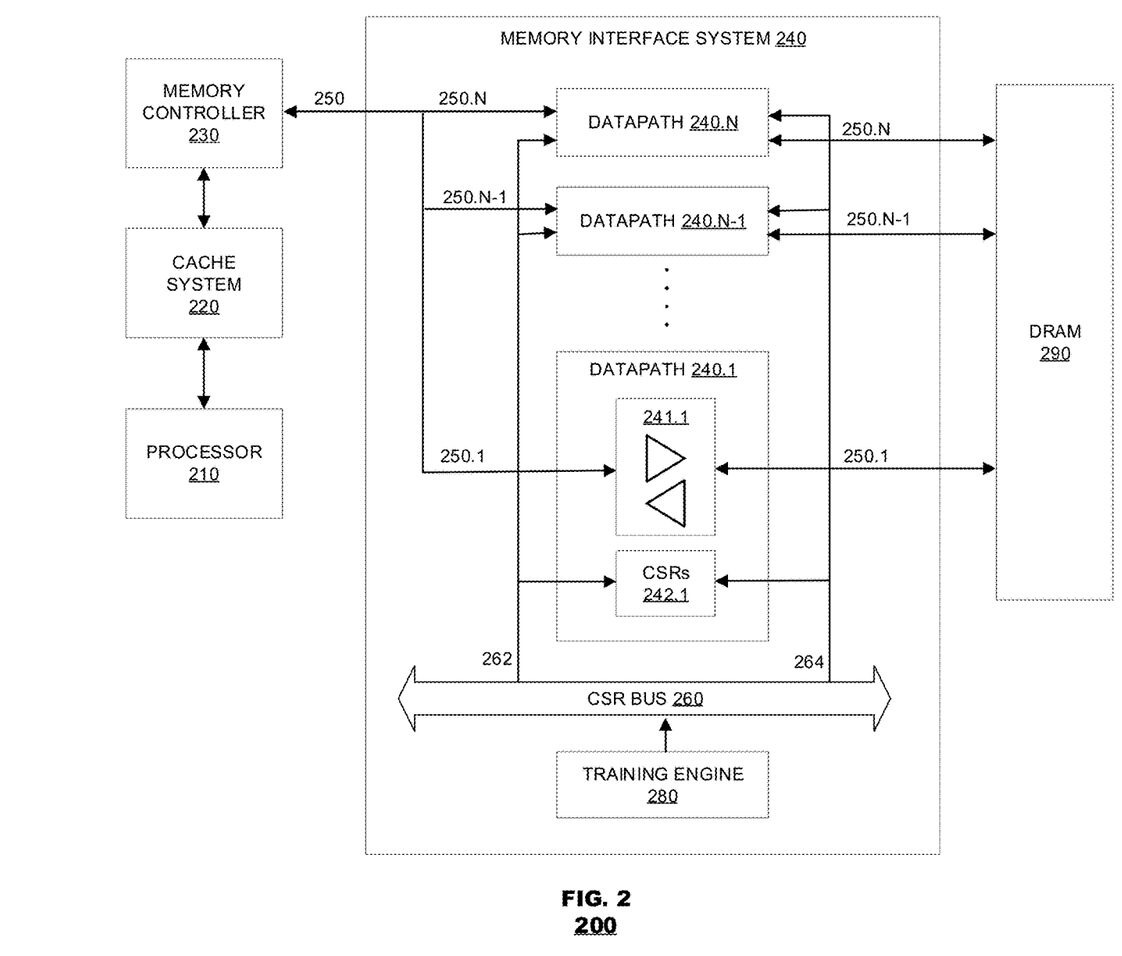
FIG. 2 is a block diagram of an example interface to memory, based on which one or more features of the disclosure can be implemented.

FIG. 2 is a block diagram of an example interface to memory 200, based on which one or more features of the disclosure can be implemented. FIG. 2 shows a processor 210 and a cache system 220 (e.g., the processor 110 or the APU 120 of FIG. 1 and their respective cache systems). Additionally shown are a memory controller 230, a memory interface system 240, and DRAM 290 (e.g., parts of the memory 150 of FIG. 1). During a training mode of operation, a training engine 280 of the memory interface system 240 is configured to calibrate operational parameters of the datapaths 240.1-N, via a CSR bus 260 (including data lines 262 and address lines 264), at various operating frequencies. During a normal mode of operation, data exchange between the processor 210 and the DRAM 290 is carried out via a mission bus 250 (including routes 250.1-N). When the operating frequency of the system 200 changes into a new frequency, the memory interface system 240 enters a transition mode. During a transition mode of operation, the operational parameters of the datapaths 240.1-N are updated with respective operational parameters that were calibrated at the new frequency during the training mode. That is, CSRs 242.1-N (that tune the operation of respective transceivers 241.1-N during the normal mode of operation) are updated in transition mode, for example, via the CSR bus 260, as further disclosed below.

The cache system 220 may include a hierarchy of caches, each containing data blocks (namely, lines) copied from the memory 290. Typically, when the processor 210 requires accessing data at a certain address, the processor 210 sends the cache system 220 a read (or write) request with respect to that address. In response, the cache system 220 checks to see whether the data from that address are already stored in one of the lines in the cache hierarchy. If the data are stored in one of the lines (i.e., a hit-event), the data will be available for the processor 210 to be read from (or written into). However, if none of the lines in the cache hierarchy store the data corresponding to the address (i.e., a miss-event), the cache system 220 will fetch a data block containing the data from the DRAM 290 via the memory controller 230 and the memory interface system 240. The fetched data block will be stored in one of the lines of the cache hierarchy (probably, in a line storing data that have not been accessed recently) and will be accessible for future reading (or writing) operations by the processor 210 (until it is replaced by another data block fetched from memory).

In a normal mode of operation, the memory interface system 240 facilitates the reading and the writing operations triggered by the memory controller 230 in response to a miss-event in the cache system 220 following a read or write request from the processor 210. To that end, the memory interface system 240 carries out signal transmissions to and signal receptions from the DRAM 290 via a dedicated bus, namely a mission bus 250. As shown in FIG. 2, the memory controller 230 and the DRAM 290 are connected by N datapaths 240.1-N through N routes 250.1-N of the mission bus 250. Reusing the mission bus in other mode of operations, as disclosed herein, is advantageous since the mission bus is already integrated along routes that lead to and from each of the CSR bank (that is, no new wires need to be allocated). Moreover, the mission bus operates in high speed, for reading from and writing to memory, that is sufficient to rewrite into CSR banks, as explained further herein.

The datapaths 240.1-N of the system 240 contain circuitry designed to enable the exchange of data between the memory controller 230 and the DRAM 290. Each datapath, e.g., 240.1, includes a receiver and a transmitter, collectively referred to as a transceiver 241.1. Typically, the receiver receives an analog signal from a corresponding DRAM's pin, converts the signal into digital data, and buffers the data into an inbound stack. Likewise, the transmitter receives digital data, popped out of an outbound stack, converts the data into an analog signal, and sends the signal to the corresponding DRAM's pin. Associated with each transceiver is a bank of CSRs. A bank, e.g., 242.1, contains CSRs, each of which stores an operating-parameter that controls (or tunes) an aspect of the transceiver 241.1 circuitry.

In a training mode of operation, the operating parameters' values are determined (calibrated) in a training process performed by the training engine 280 of the system 240. The training engine 280 may be implemented by software, hardware, or firmware, for example, as described in U.S. patent application Ser. No. 17/564,327, filed Dec. 29, 2021, titled "DRAM specific interface calibration via programmable training sequences," and in U.S. patent application Ser. No. 17/564,426, filed Dec. 29, 2021, titled "variable tick for DRAM interface calibration."

Hence, calibration of operating-parameters (e.g., voltage offsets and timing delays) that tune the transceivers is necessary to secure a reliable interface with the DRAM 290. The system 240 may be triggered to enter a training mode at booting and periodically to perform recalibration that compensates for variations in the computing environments and in manufacturing (associated with the DRAM, the processing unit that accesses the DRAM, and the communication link between them). Thus, the training engine 280 is configured to conduct a training process through which the values of operating parameters are calibrated. The training engine 280 writes the calibrated values into the respective CSRs 242.1-N, through the serial CSR bus 260.

The CSR bus 260 includes address lines 264 and data lines 262 that are connected to all the CSRs in the banks 242.1-N. Accordingly, the CSRs can be accessed serially. That is, one CSR can be accessed at a time by feeding the address lines 264 with that CSR's address and by feeding the data lines 262 with the data to be stored in that CSR. A CSR's address, typically, contains a bank address that selects the bank and a base address that selects one CSR in the selected bank. This standard way of serial communication requires several clock cycles to update all the CSRs. For example, in a case where there are N=64 CSR banks and where each bank contains P=100 CSRs, 6,400 clock cycles are required to update these N P=6,400 CSRs (assuming writing into one CSR takes one clock cycle).

Conventionally, to reduce power consumption, processing units (e.g., units 210-240) may be designed to operate in multiple operating frequencies (during a normal mode of operation), transitioning from one frequency to another (through a transition mode of operation) based on the nature of the current workload. Therefore, the calibration of operating parameters in a memory interface system 240 should be carried out at each of the possible operating frequencies, and the resulting frequency-dependent versions of the calibrated operating parameters should be made readily available as frequency changes.

In one approach, each CSR hardware is duplicated, having multiple CSRs, and each stores an operating parameter that is used to tune the respective transceiver when operating at a certain frequency. Thus, to secure reliable performance of the memory interface system 240 in M different operating frequencies, each CSR in a CSR bank, e.g., 242.1, should be duplicated into M number of registers corresponding to the M different frequencies. In such a scenario, the training engine 280 is configured to carry out the training of the memory interface system 240 at each of the M frequencies—and then to store the calibrated operating-parameters in the respective CSRs via the CSR bus 260. For example, in a case where there are N=64 CSR banks and where each bank containing M P=10·100 CSRs that store 10 versions (for 10 different frequencies) of 100 operating parameters, a total number of N M P=64,000 CSRs have to be written through the serial CSR bus 260. Assuming, as before, that writing into an CSR takes one clock cycle, updating all the CSRs 242.1-N each time a training process is triggered will take 64,000 clock cycles. The benefit of this approach though is that when the memory interface system 240 is triggered to transition into a new operating-frequency, operating parameters that were calibrated at the new frequency are readily available in the corresponding CSRs. However, this benefit is at the cost of increased power consumption caused by the duplication of CSR hardware and the die space the duplicated hardware occupies.

In an alternative approach, instead of duplicating each CSR hardware into M number of CSRs (corresponding to the M different frequencies), the training engine 280 can store the M versions of calibrated operating parameters in memory (e.g., local to the memory interface system 240). Then, each time the memory interface system 240 is triggered to perform a frequency transition, the version of the calibrated operating parameters that corresponds to the new frequency the system 240 transitions into can be copied from the memory to the respective CSRs. This alternative saves the need to duplicate the CSRs. However, writing into the CSR banks 242.1-N using the CSR bus 260 is still performed serially, consuming N P clock cycles that have to be spent each time a frequency transition is triggered. In spite of avoiding the need to duplicate the CSRs, in this alternative the processing time the system 240 spends during a transition mode of operation increases proportionally with the number of CSRs.

The approaches discussed above—either duplicating each CSR (thus, resulting in increased hardware components) or storing the frequency-dependent versions of operating parameters in memory and copying a version of the operating parameters to respective CSRs upon frequency transition (thus, resulting in increased processing time)—contribute to increased power consumption associated with transitioning from one operating frequency to another through the transition mode of operation. Aspects disclosed herein alleviate the power inefficiency associated with frequency transitions, as described in reference to FIG. 3.

Figure 3:
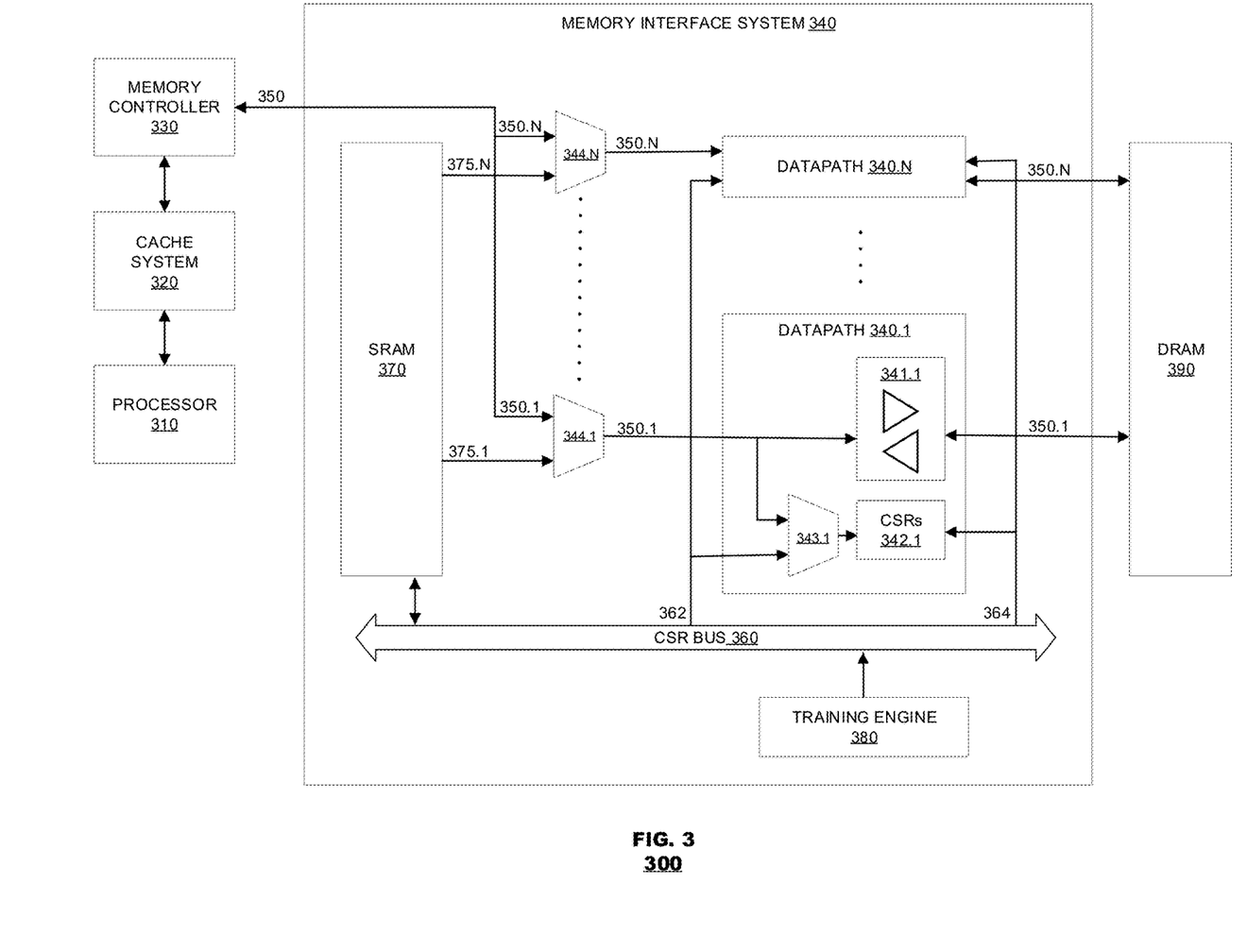
FIG. 3 is a block diagram of another example interface to memory, based on which one or more features of the disclosure can be implemented.

FIG. 3 is a block diagram of another example interface to memory 300, based on which one or more features of the disclosure can be implemented. FIG. 3 shows a processor 310 and a cache system 320 (e.g., the processor 110 or the APU 120 of FIG. 1 and their respective cache systems). Additionally shown are a memory controller 330, a memory interface system 340, and DRAM 390 (e.g., parts of the memory 150 of FIG. 1). During a training mode of operation, a training engine 380 of the memory interface system 340 is configured to calibrate operational parameters of the datapaths 340.1-N, via a CSR bus 360 (including address lines 362 and data lines 364), at various operating frequencies. These operational parameters are stored in an SRAM 370. During a normal mode of operation, data exchange between the processor 310 and the DRAM 390 is carried out via a mission bus 350 (including routes 350.1-N). When the operating frequency of the system 300 changes into a new frequency, the memory interface system 340 enters a transition mode. During a transition mode of operation, the operational parameters of the datapaths 340.1-N are updated with respective operational parameters that were calibrated at the new frequency during the training mode. That is, CSRs 342.1-N (that tune the operation of respective transceivers 341.1-N during the normal mode of operation) are updated with respective operational parameters stored in the SRAM 370 via the multiplexers 344, 343 across the mission bus 350, as further disclosed below.

The cache system 320 may include a hierarchy of caches, each containing data blocks (namely, lines) copied from the memory 390. As described in reference to FIG. 2, in response to a processor's 310 request 320 to access data in a certain address, a hit-event (when the data reside in one of the lines of the cache system 320) or a miss-event (when the data do not reside in any of the lines of the cache system 320) may occur. Following a miss-event, the cache system 320 fetches the data block containing the data requested by the processor 310 from the DRAM 390 (via the memory controller 330 and the memory interface system 340).

In a normal mode of operation, the memory interface system 340 facilitates the reading and the writing operations triggered by the memory controller 330 in response to a miss-event in the cache system 320 following a read or a write request from the processor 310. To that end, the memory interface system 340 carries out signal transmissions to and signal receptions from the DRAM 390 via a mission bus 350. The memory interface system 340 includes datapaths 340.1-N, each designed to enable the exchange of data between the memory controller 330 and the DRAM 390. Each datapath, e.g., 340.1, includes a receiver and a transmitter, that is, a transceiver 341.1. Typically, the receiver receives an analog signal from a corresponding DRAM's pin, converts the signal into digital data, and buffers the data into an inbound stack. Likewise, the transmitter receives digital data, popped out of an outbound stack, converts the data into an analog signal, and sends the signal to the corresponding DRAM's pin. Associated with each transceiver, e.g., 340.1, is a bank of CSRs, e.g. 342.1. The CSRs in each bank, e.g., 342.1, store operating parameters that control (or tune) operational aspects of the transceiver circuitry 341.1. The operating parameters' values are determined (calibrated) in a training process performed by the training engine 380 when the system 340 is in training mode.

As described above in reference to FIG. 2, training the memory interface, a process through which operating parameters are calibrated, has to be carried out periodically to secure a reliable interface with the DRAM. Furthermore, calibration should be performed with respect to M different frequencies to maintain memory interface reliability when the system 340 is transitioned to operate at the different operating frequencies. Thus, the system's 340 normal mode of operation may be interrupted when the system 340 enters a training mode of operation (e.g., triggered when the system boots and periodically afterwards) or when the system 340 enters a transition mode of operation (to facilitate transition into a new operating frequency).

As disclosed herein, to reduce the power consumption associated with frequency transitions, the memory interface system 340 further includes SRAM 370, upstream multiplexers 344.1-N, and downstream multiplexers 343.1-N. The SRAM 370 is used by the training engine 380 to store the frequency-dependent versions of the operating parameters. Compared to registers, SRAM are a more efficient media of data storage in terms of the physical space (10 times smaller) and power consumption (30 times more efficient). Each version of the operating parameters stored in the SRAM is generated based on a training process that calibrates the operating parameters' values when the datapaths 340.1-N operate at one of the M frequencies.

In a transition mode of operation, through which the system 340 is to transition into a new operating frequency, data exchange through the transceivers 341.1-N across the mission bus 350 is halted and the mission bus 350 is used instead to copy a version of the operating parameters (corresponding to the new frequency) into respective CSRs 342.1-N. For example, in a transition mode of operation, the upstream multiplexer 344.1 is set to channel data from the SRAM 370 into the mission bus route 350.1 (that is, wire 375.1 is selected by the upstream multiplexer 344.1, switching off the memory controller 330). On the other end, downstream multiplexer 343.1 is set to channel data received on the mission bus route 350.1 into the CSR bank 342.1 (That is, the mission bus route 350.1 is selected, switching off the data lines 362 from the CSR bus 360). Hence, during the transition mode of operation, data from the SRAM are channeled from wires 375.1-N, through respective mission bus routes 350.1-N, to respective CSR banks 342.1-N. In contrast to the serial access provided by the CSR bus 360, as disclosed herein, writing data from the SRAM into the CSR banks can be performed in parallel, as explained below.

Figure 4:
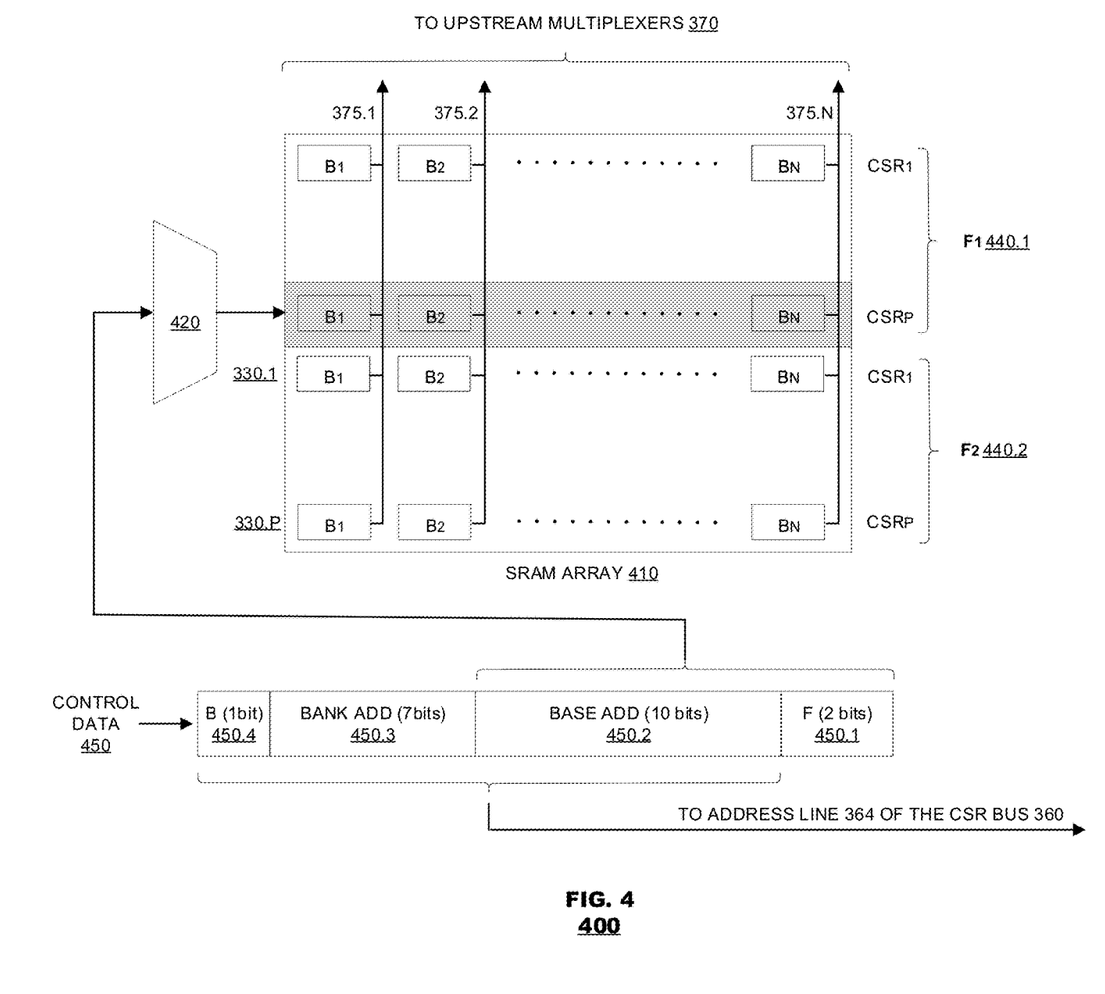
FIG. 4 is a diagram of an example static random-access memory (SRAM) utilization, based on which one or more features of the disclosure can be implemented.

FIG. 4 is a diagram of an example SRAM utilization 400, based on which one or more features of the disclosure can be implemented. FIG. 4 demonstrates the manner in which corresponding CSRs across all banks 342.1-N are updated in parallel, using the mission bus 350 and the address lines 364 of the CSR bus, with respective operating parameters stored in the SRAM 370. To enable parallel writing of operational parameters, an SRAM array 410 is structured in rows, as follows. Each row in the array 410 contains data of calibrated operating parameters, associated with corresponding CSRs across all banks, that had been trained at the same frequency. For example, in the first row, operating parameters that are to be copied to the first register, $CSR_1$, in all the banks ($B_1$ (342.1) through $B_N$ (342.N)) are stored. Likewise, in the second row (not shown), operating parameters that are to be copied to the second register, $CSR_2$, in all the banks ($B_1$ (342.1) through $B_N$ (342.N)) are stored. The operating parameters in the P first rows (that are to be copied, respectively, to $CSR_1$-$CSR_P$) were calibrated when the datapaths 340.1-N were operating at frequency $F_1$ 440.1. Next stored in the SRAM array 410 are those operating parameters that were calibrated when the datapaths 340.1-N were operating at frequency $F_2$ 440.2, and so forth.

Control data 450 are used to implement the writing operation, containing data elements such as a frequency selector 450.1, a base address 450.2, a bank address 450.3, and a broadcast flag 450.4. As illustrated in FIG. 4, the frequency selector 450.1 and the base address 450.2 can be used to select the row in the SRAM 410 from which operational parameters are to be written into corresponding CSRs across all the banks 342.1-N. And, the base address 450.2, the bank address 450.3, and the broadcast flag 450.4 can be used to select those corresponding CSRs. Hence, the base address 450.2 (that can select each of the P number of CSRs in a CSR bank) together with a frequency selector 450.1 can be used by the decoder 420 to select a row (e.g., the shaded row $CSR_P$ at frequency $F_1$). The selected row data are written (via the mission bus, as described in reference to FIG. 3) into corresponding CSRs across the CSR banks 342.1-N. Those corresponding CSRs across the CSR banks are enabled to be written into via their address lines 364 that are fed with the control data in: the base address 450.2, the bank address 450.3, and the broadcast flag 450.4. Note that when the broadcast flag 450.4 is off, one bank is enabled for writing based on the bank address 450.3 that is fed into the address lines 364. However, to enable concurrent writing into all the banks, when the broadcast flag 450.4 is on, all the banks are enabled for writing, so that parallel writing into all corresponding registers (determined by the base address) is enabled.

For example, when transitioning from operating frequency $F_1$ to operating frequency $F_2$ occurs, the memory interface system 340 updates the CSR banks 342.1-N (that currently store the operational parameters that correspond to operating frequency $F_1$ 440.1) with operational parameters that correspond to operating frequency $F_2$ 440.2. To that end, the memory interface system 340 issues P number of writing commands with respect to the rows 330.1-P that correspond to frequency $F_2$ 440.2. Thus, for example, to write the data stored in row 330.1 to the first register in all the banks 342.1-N, a control data 450 is set, so that: 1) the decoder selects row 330.1 based on the base address 450.2 and the frequency selector 450.1; 2) the base address 450.2 selects the first register in all the banks 342.1-N; and 3) the broadcast flag 450.4 is activated to enable parallel writing into all the banks 342.1-N. Note that the base address 450.2, bank address 450.3, and broadcast flag 450.4 are fed into the address lines 364 of the CSR bus 360. Using SRAM as described above decreases the time it takes to update the CSRs in response to a frequency transition in a degree proportional to N, the number of banks (or the number of transceivers) that are used in the interface to the DRAM.

Figure 5:
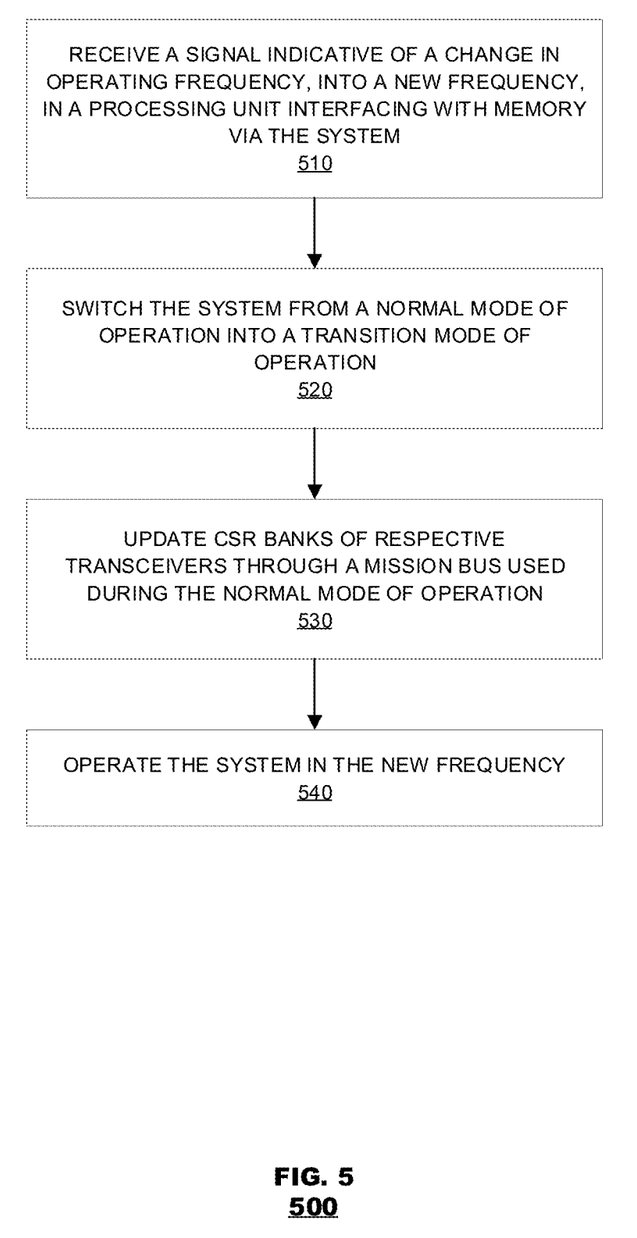
FIG. 5 is a flowchart of an example method for frequency transitioning in a memory interface system, based on which one or more features of the disclosure can be implemented.

FIG. 5 is a flowchart of an example method 500 for frequency transitioning in a memory interface system, based on which one or more features of the disclosure can be implemented. According to the method 500, the memory interface system 340, in step 510, receive a signal indicative of a change in operating frequency (into a new frequency) in a processing unit interfacing with memory via the system 340. In response, the system 340, in step 520, switches from a normal mode of operation into a transition mode of operation. The switching involves halting data exchange by the transceivers 341.1-N across the mission bus routes 350.1-N that are used during the normal mode of operation. When the system 340 is in transition mode, in step 530, CSR banks 342.1-N of respective transceivers 341.1-N are updated through the mission bus 350. Following the update of the CSR banks, in step 540, the system 340 is configured to operate in the new frequency. As explained above, to update the CSR banks, a version of operating parameters is written into respective CSRs in the CSR banks. The written version includes operating parameters that were calibrated when the system 340 was operated at the new frequency. A version of operating parameters can be partitioned into multiple subsets of operating parameters. Each subset contains operating parameters that are associated with receptive CSRs, where the receptive CSRs are corresponding CSRs residing across the CSR banks. Each such subset can be stored in a respective row of SRAM. In this way, the data in each subset can be written in parallel from the subset's respective row in the SRAM into the subset's respective CSRs across the CSR banks.

The method 500 further includes switching into a training mode of operation. In that mode the versions of operating parameters are calibrated by the training engine 380. Each version of operating parameters is calibrated when the system operates at a respective frequency. Following calibration, the resulting versions of operating parameters are stored in blocks of rows in the SRAM 410. Each block stores a version of the operating parameters that are calibrated at a respective frequency and each row in a block stores a subset of the operating parameters stored in the block. A subset contains operating parameters associated with receptive CSRs, these respective CSRs are corresponding CSRs, each resides in a different bank.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in semiconductor manufacturing processes to manufacture processors that implement aspects of the embodiments.

The methods or flow charts provided herein can be implemented in a computer program, software, or firmware incorporated in a non-transitory computer-readable storage medium for execution by a general-purpose computer or processor. Examples of non-transitory computer-readable media include read only memory (ROM), random-access memory (RAM), a register, cache memory, semiconductor memory devices, magnetic media such as internal hard drive and disks and removable disks, magneto-optical media, and optical media such as CD-ROM disks, and digital versatile disks (DVDs).

What is claimed is:

1. A method for frequency transitioning in a memory interface system, comprising:
    receiving a signal indicative of a change in operating frequency, to a new frequency, in a processing unit interfacing with memory via the system;
    switching the system from a normal mode of operation to a transition mode of operation;
    updating control and state register (CSR) banks of respective transceivers of the system through a dedicated bus for transmissions to and receptions from memory used during the normal mode of operation; and
    operating the system in the new frequency.

2. The method of claim 1, wherein the switching from the normal mode of operation to the transition mode of operation comprises halting data exchange by the transceivers across the dedicated bus for transmissions to and receptions from memory.

3. The method of claim 1, wherein the updating of the CSR banks comprises: writing a version of operating parameters to respective CSRs in the CSR banks, the version of the operating parameters is calibrated according to operation in the new frequency.

4. The method of claim 3, wherein: the version of operating parameters includes multiple subsets of operating parameters, each subset containing operating parameters associated with respective CSRs, the respective CSRs are corresponding CSRs across the CSR banks, each subset is stored in a respective row of static random-access memory (SRAM); and the writing comprises writing in parallel each subset of operating parameters from a respective row in the SRAM to respective CSRs across the CSR banks.

5. The method of claim 4, wherein the writing is performed using control data, including a broadcast flag that enables the parallel writing to CSR banks.

6. The method of claim 4, wherein the writing is performed using control data, including a row selector used by a decoder to select a row in the SRAM from which a subset of the multiple subsets is written to the subset's respective CSRs across the CSR banks.

7. The method of claim 1, further comprising: switching to a training mode of operation, wherein versions of operating parameters are calibrated by a training engine, each version of operating parameters is calibrated when the system operates at a respective frequency.

8. The method of claim 4, wherein the versions of operating parameters are stored in blocks of rows in the SRAM, each block stores a version of the operating parameters that are calibrated at a respective frequency, and each row in the block stores a subset of the operating parameters, containing operating parameters associated with respective CSRs, the respective CSRs are corresponding CSRs across the CSR banks.

9. A memory interface system for frequency transitioning, comprising:
at least one processor; and memory storing instructions that, when executed by the at least one processor, cause the processor to:
receive a signal indicative of a change in operating frequency, to a new frequency, in a processing unit interfacing with memory via the system,
switch the system from a normal mode of operation to a transition mode of operation,
update CSR banks of respective transceivers of the system through a dedicated bus for transmissions to and receptions from memory used during the normal mode of operation, and
operate the system in the new frequency.

10. The system of claim 9, wherein the switching from the normal mode of operation to the transition mode of operation comprises halting data exchange by the transceivers across the dedicated bus for transmissions to and receptions from memory.

11. The system of claim 9, wherein the updating of the CSR banks comprises: writing a version of operating parameters to respective CSRs in the CSR banks, the version of the operating parameters is calibrated according to operation in the new frequency.

12. The system of claim 11, wherein: the version of operating parameters includes multiple subsets of operating parameters, each subset containing operating parameters associated with respective CSRs, the respective CSRs are corresponding CSRs across the CSR banks, each subset is stored in a respective row of static random-access memory (SRAM); and the writing comprises writing in parallel each subset of operating parameters from a respective row in the SRAM to respective CSRs across the CSR banks.

13. The system of claim 12, wherein the writing is performed using control data, including a broadcast flag that enables the parallel writing to CSR banks.

14. The system of claim 12, wherein the writing is performed using control data, including a row selector used by a decoder to select a row in the SRAM from which a subset of the multiple subsets is written to the subset's respective CSRs across the CSR banks.

15. The system of claim 9, wherein the instructions further cause the processor to: switch to a training mode of operation, wherein versions of operating parameters are calibrated by a training engine, each version of operating parameters is calibrated when the system operates at a respective frequency.

16. The system of claim 15, wherein the versions of operating parameters are stored in blocks of rows in static random-access memory (SRAM), each block stores a version of the operating parameters that are calibrated at a respective frequency, and each row in the block stores a subset of the operating parameters, containing operating parameters associated with respective CSRs, the respective CSRs are corresponding CSRs across the CSR banks.

17. A non-transitory computer-readable medium comprising instructions executable by at least one processor to perform a method for frequency transitioning in a memory interface system, the method comprising:
receiving a signal indicative of a change in operating frequency, to a new frequency, in a processing unit interfacing with memory via the system;
switching the system from a normal mode of operation to a transition mode of operation;
updating CSR banks of respective transceivers of the system through a dedicated bus for transmissions to and receptions from memory used during the normal mode of operation; and
operating the system in the new frequency.

18. The medium of claim 17, wherein the switching from the normal mode of operation to the transition mode of operation comprises halting data exchange by the transceivers across the dedicated bus for transmissions to and receptions from memory.

19. The medium of claim 17, wherein the updating of the CSR banks comprises: writing a version of operating parameters to respective CSRs in the CSR banks, the version of the operating parameters is calibrated according to operation in the new frequency.

20. The medium of claim 19, wherein: the version of operating parameters includes multiple subsets of operating parameters, each subset containing operating parameters associated with respective CSRs, the respective CSRs are corresponding CSRs across the CSR banks, each subset is stored in a respective row of static random-access memory (SRAM); and the writing comprises writing in parallel each subset of operating parameters from a respective row in the SRAM to respective CSRs across the CSR banks.

21. The medium of claim 20, wherein the writing is performed using control data, including a broadcast flag that enables the parallel writing to CSR banks.

22. The medium of claim 20, wherein the writing is performed using control data, including a row selector used by a decoder to select a row in the SRAM from which a subset of the multiple subsets is written to the subset's respective CSRs across the CSR banks.

23. The medium of claim 17, further comprising: switching to a training mode of operation, wherein versions of operating parameters are calibrated by a training engine, each version of operating parameters is calibrated when the system operates at a respective frequency.

24. The medium of claim 23, wherein the versions of operating parameters are stored in blocks of rows in static random-access memory (SRAM), each block stores a version of the operating parameters that are calibrated at a respective frequency, and each row in the block stores a subset of the operating parameters, containing operating parameters associated with respective CSRs, the respective CSRs are corresponding CSRs across the CSR banks.

* * * * *